United States Patent
Myers et al.

(10) Patent No.: US 6,505,794 B2
(45) Date of Patent: Jan. 14, 2003

(54) LARGE THERMAL PROTECTION SYSTEM PANEL

(75) Inventors: Franklin K. Myers, Beverly Hills, CA (US); David J. Weinberg, Garden Grove, CA (US); Tu T. Tran, Westminster, CA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 09/769,118

(22) Filed: Jan. 24, 2001

(65) Prior Publication Data

US 2002/0096601 A1 Jul. 25, 2002

(51) Int. Cl.$^7$ .................................................. B64G 1/58
(52) U.S. Cl. ..................... 244/158 A; 244/121; 244/131
(58) Field of Search ............................ 244/158 R, 121, 244/131; 403/428, 328, 327, 322.1; 52/404.1, 404.2, 406.2, 466.3

(56) References Cited

U.S. PATENT DOCUMENTS

| | | | |
|---|---|---|---|
| 3,830,666 A | * 8/1974 | Schneider | 244/117 A |
| 4,151,800 A | 5/1979 | Dotts et al. | |
| 4,344,591 A | * 8/1982 | Jackson | 244/158 A |
| 4,713,275 A | 12/1987 | Riccitiello et al. | |
| 4,804,571 A | 2/1989 | Jouffreau | |
| 4,919,366 A | 4/1990 | Cormier | |
| 4,925,134 A | * 5/1990 | Keller et al. | 244/158 R |
| 5,038,693 A | * 8/1991 | Kourtides et al. | 428/285 |
| 5,154,373 A | 10/1992 | Scott | |
| 5,263,665 A | 11/1993 | Kineczny et al. | |
| 5,624,088 A | 4/1997 | Fiore | |
| 6,007,026 A | * 12/1999 | Shorey | 244/158 R |
| 6,299,106 B1 | * 10/2001 | Shorey | 244/158 R |

OTHER PUBLICATIONS

Publication entitled "High–Temperature Insulations" by Keller et al, Nov. 1, 1994.

* cited by examiner

*Primary Examiner*—Galen L. Barefoot
(74) *Attorney, Agent, or Firm*—Harness, Dickey & Pierce, P.L.C.

(57) ABSTRACT

A protective panel for a reusable launch vehicle provides enhanced moisture protection, simplified maintenance, and increased temperature resistance. The protective panel includes an outer ceramic matrix composite (CMC) panel, and an insulative bag assembly coupled to the outer CMC panel for isolating the launch vehicle from elevated temperatures and moisture. A standoff attachment system attaches the outer CMC panel and the bag assembly to the primary structure of the launch vehicle. The insulative bag assembly includes a foil bag having a first opening shrink fitted to the outer CMC panel such that the first opening and the outer CMC panel form a water tight seal at temperatures below a desired temperature threshold. Fibrous insulation is contained within the foil bag for protecting the launch vehicle from elevated temperatures. The insulative bag assembly further includes a back panel coupled to a second opening of the foil bag such that the fibrous insulation is encapsulated by the back panel, the foil bag, and the outer CMC panel. The use of a CMC material for the outer panel in conjunction with the insulative bag assembly eliminates the need for waterproofing processes, and ultimately allows for more efficient reentry profiles.

20 Claims, 2 Drawing Sheets

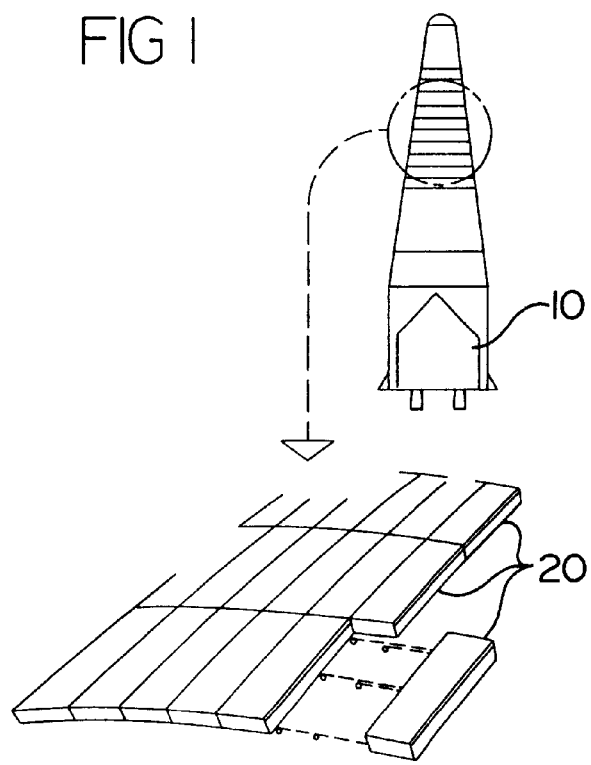
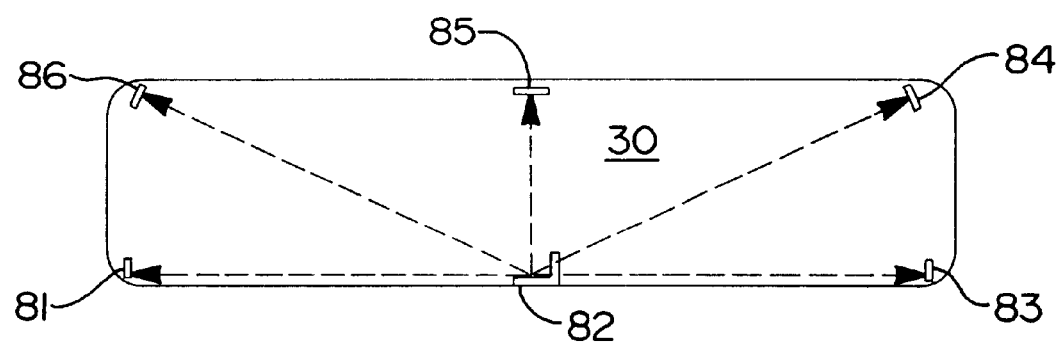

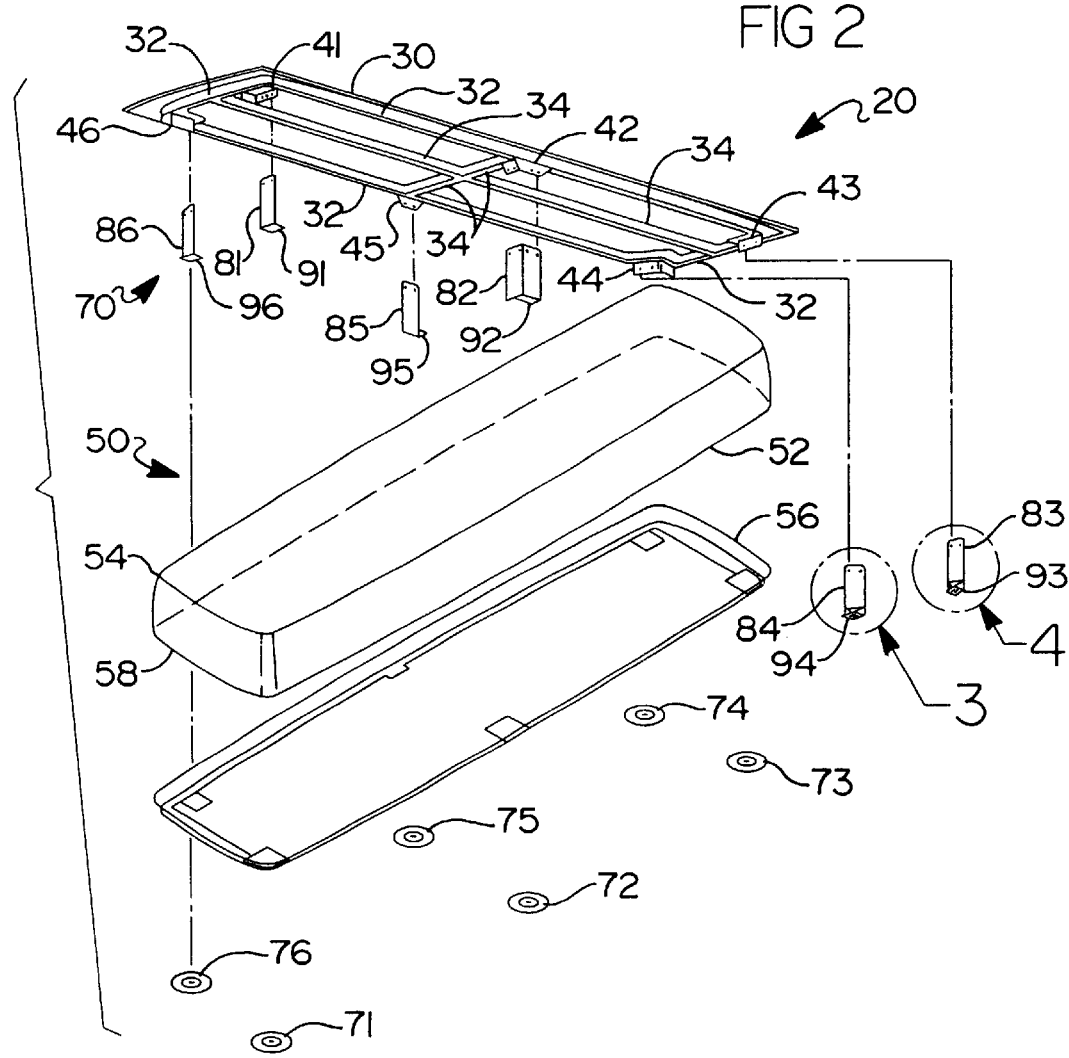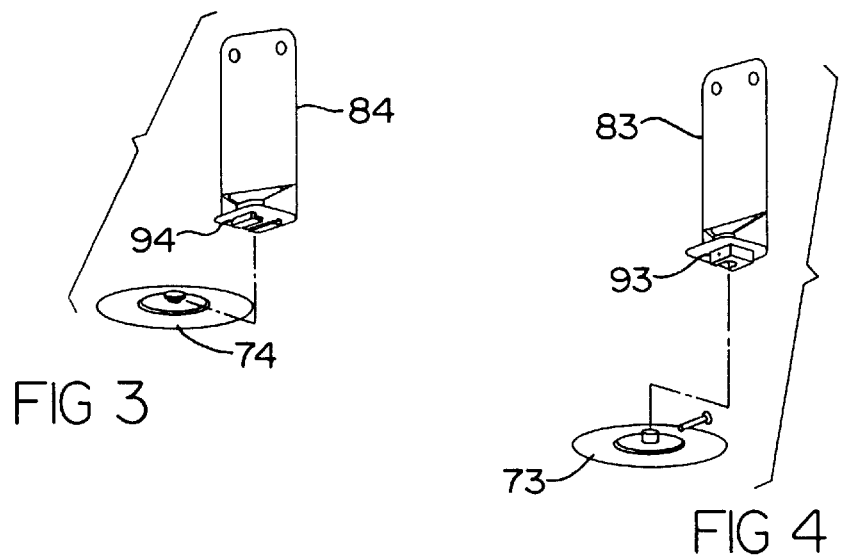

LARGE THERMAL PROTECTION SYSTEM PANEL

STATEMENT REGARDING FEDERALLY SPONSORED RESEARCH OR DEVELOPMENT

This invention was made under Cooperative Agreement No. NCC1-192 awarded by NASA. The U.S. government has certain rights in this invention.

TECHNICAL FIELD

The present invention relates generally to reusable launch vehicles. More particularly, the invention relates to a protective panel for a reusable launch vehicle having an outer ceramic matrix composite panel and an insulative bag assembly.

BACKGROUND ART

In the space transportation industry, recent trends have been toward developing space vehicles that have aircraft-like operability. The result has been the evolution of the reusable launch vehicle (RLV) to provide such operability. In order to fully realize the vision and potential of the RLV, a number of considerations relating to launch, reentry, and maintenance must be addressed. In response to many of these considerations, the typical RLV relies upon the thermal protection system (TPS) concept.

One approach to the modern day TPS involves the attachment of ceramic tiles and blankets to an outer surface of the RLV. There is room for improvement, however, with regard to the manner in which these tiles and blankets provide protection to the RLV. Typically, water molecules from the environment will penetrate the tile or blanket unless some form of moisture protection is provided. It is therefore common to inject the tile or blanket with a waterproofing compound that essentially coats the internal fibers to prevent "wicking". This process involves the use of a considerable amount of materials and labor, which are both at a premium in the space transportation industry. Furthermore, the high temperatures associated with reentry of the RLV have a tendency to "bake" out the waterproofing compound such that re-waterproofing is required after each use. The re-waterproofing process can be extremely costly and time consuming. It is therefore desirable to provide a protective panel for an RLV that does not require waterproofing or re-waterproofing.

In recent years, metallic panels have been developed that partially address the above waterproofing concerns. There is considerable room for improvement, however, over these designs as well. For example, the metallic panels are typically made of nickel based alloys that will protect the RLV from temperatures around 1800° F. (982° C.). This temperature limitation has a direct relationship with the reentry profile for the RLV. Specifically, the lower temperature threshold associated with metallic tiles results in less efficient reentry profiles due to the need to minimize temperature elevations. Furthermore, the metallic tiles are significantly heavier than conventional ceramic tiles. It is therefore desirable to provide a protective panel for an RLV that is resistive to elevated temperatures and is relatively light weight.

It is also important to note that the dimensions of ceramic tiles are critical to avoid breakage. Thus, conventional ceramic tiles are typically 6" by 6" in size, with a 3" maximum thickness. The relatively small size of these panels can add to manufacturing costs by requiring the fabrication of a higher number of panels. It is therefore desirable to provide a protective panel for a RLV that is larger in size than conventional panels.

SUMMARY OF THE INVENTION

The above and other objectives are provided by a protective panel for an RLV in accordance with the present invention. The protective panel includes an outer ceramic matrix composite (CMC) panel for isolating the RLV from elevated temperatures, and an insulative bag assembly coupled to the outer CMC panel. The insulative bag assembly isolates the RLV from moisture as well as elevated temperatures. A standoff attachment system attaches the outer CMC panel and the bag assembly to the RLV primary structure (e.g. tank wall). The use of CMC material for the outer panel provides the ability to withstand significantly higher temperatures as well as reduced weight. Furthermore, the waterproof insulative bag assembly eliminates the need for re-waterproofing.

Further in accordance with the present invention, an insulative bag assembly for an RLV protective panel is provided. The bag assembly includes a foil bag having a first opening shrink fitted to an outer panel such that the first opening and the outer panel form a water tight seal at temperatures below a desired temperature threshold. Fibrous insulation is contained within the foil bag for further protecting the launch vehicle from elevated temperatures. The bag assembly further includes a back panel coupled to a second opening of the foil bag such that the fibrous insulation is encapsulated by the back panel, the foil bag, and the outer panel.

The present invention also provides a method for fabricating an RLV protective panel. The method includes the steps of heating a foil bag and an outer CMC panel to a predetermined stretching temperature, where the stretching temperature defines a temperature threshold at which the foil bag expands to a circumference that is greater than the circumference of an attachment surface of the outer CMC panel. A first opening of the foil bag is then positioned around the attachment surface of the outer CMC panel. The method further provides for cooling the foil bag and the outer CMC panel to a predetermined shrinking temperature, where the shrinking temperature defines a temperature threshold at which the foil bag retracts to a circumference that is less than the circumference of the attachment surface.

BRIEF DESCRIPTION OF THE DRAWINGS

The various advantages of the present invention will become apparent to one of ordinary skill in the art by reading the following specification and sub-joined claims and by referencing the following drawings, in which:

FIG. 1 is a diagram of an RLV having a plurality of protective panels in accordance with a preferred embodiment of the present invention;

FIG. 2 is an exploded view of a protective panel in accordance with a preferred embodiment of the present invention; and FIGS. 3 and 4 are perspective views of two of the standoffs used with the present invention; and FIG. 5 is a diagram of the relative positions of a plurality of standoffs for a standoff attachment system in accordance with a preferred embodiment of the present invention.

DETAILED DESCRIPTION OF THE PREFERRED EMBODIMENTS

In FIG. 1, a reusable launch vehicle (RLV) 10 having a plurality of protective panels 20 in accordance with the preferred embodiment of the present invention is shown. It can be seen that the protective panels 20 are installed along the forward lower surface of the RLV 10. It is well known that the forward lower surface is an area of the RLV that is subjected to relatively high loads and elevated temperatures during reentry. While the protective panels 20 are shown in high temperature locations, it will be appreciated that the protective panels 20 can be used throughout the RLV 10 without parting from the spirit and scope of the present invention. As will be discussed in greater detail below, the protective panels 20 provide improved moisture protection, reduced maintenance, and more efficient reentry profiles than conventional approaches.

Turning now to FIG. 2, one embodiment of the protective panel 20 is shown in greater detail. Generally, the protective panel 20 has an outer ceramic matrix composite (CMC) panel 30 for isolating the RLV 10 from elevated temperatures, an insulative bag assembly 50, and a standoff attachment system 70. The insulative bag assembly 50 is coupled to the outer CMC panel 30 and isolates the RLV 10 from moisture as well as elevated temperatures. The standoff attachment system 70 attaches the outer CMC panel 30 and the bag assembly 50 to the RLV 10 primary structure (not shown).

The insulative bag assembly 50 preferably includes a foil bag 52 having a first opening 54 shrink fitted to the outer CMC panel 30 such that the first opening 54 and the outer CMC panel 30 form a water tight seal at temperatures below a desired temperature threshold. As will be discussed in greater detail below, the foil bag 52 is preferably fabricated from approximately 0.003-inch (0.072 mm) gage commercially available PM 2000 foil. This allows the bag 52 to be shrink fitted to the outer CMC panel at approximately 800° F. (426° C.). It is important to note that higher or lower shrink fitting temperatures are available by properly selecting the foil bag material from any number of well known materials. Fibrous insulation (not shown) is contained within the foil bag 52 for further protecting the RLV 10 from elevated temperatures. A back panel 56 is coupled to a second opening 58 of the foil bag 52 such that the fibrous insulation is encapsulated by the back panel 56, the foil bag 52, and the outer CMC panel 30. Heat shrinking the bag 52 provides a tight fit and automatic waterproofing at temperatures below the desired temperature threshold. In the preferred embodiment the desired temperature threshold is approximately 400° F. Waterproofing when the temperature of the panel 20 is above this threshold is not a concern, since moisture is typically not present at the temperatures common to reentry. The details of fabricating the insulative bag assembly 50 will be discussed below.

It can also be seen that the back panel 56 is corrugated such that stiffness is increased along a predetermined axis of the back panel 56. Here, the predetermined axis is the short axis of the back panel 56. Since temperatures of the back panel 56 do not exceed 1100° F. (593° C.—due to the outer CMC panel 30 and the bag assembly 50), titanium is used in order to reduce weight. Thus, the back panel 56 can accommodate thermal strain along its major axis because of its unique curved side wall configuration and corrugation. The panel 56 is preferably fashioned in this manor to minimize weight, while withstanding the conditions of launch and reentry. The back panel 56 therefore provides a mechanism for closing out the panel 20, supplying rigidity for overall panel assembly sliding attachment, and providing for thermal mismatch between the panel 20 and the primary structure during both cryoloading and post-landing thermal soak through.

The outer CMC panel 30 will now be described in greater detail. Generally, it can be seen that the outer CMC panel 30 includes a plurality of stiffening ridges for providing stability to the outer CMC panel 30, where one or more of the stiffening ridges define an attachment surface for coupling the insulative bag assembly 50 to the outer CMC panel 30. It is preferred that the stiffening ridges include perimeter stiffeners 32 disposed adjacent to a perimeter of the outer CMC panel 30. It can be seen that the perimeter stiffeners 32 are curved to improve coupling between the insulative bag assembly 50 and the outer CMC panel 30. It is also preferred that the stiffening ridges include internal stiffeners 34 disposed adjacent to a non-perimeter region of the outer CMC panel 30. It can be seen that the stiffeners 32, 34 have a plurality of integral standoffs 41, 42, 43, 44, 45, 46 for coupling the outer CMC panel 30 to the standoff attachment system 70. The integral standoffs therefore provide stability to the panel 20 under loading to enable a minimum thickness for the outer CMC panel 30. The preferred outer CMC panel 30 is commercially available from DaimlerChrysler Aerospace AG, and is made of C/SiC to account for the high temperatures associated with reentry. The outer CMC panel 30 is therefore designed to withstand temperatures ranging up to approximately 2750° F. (1510° C.). It is important to note that the increased temperature resistance allows more aggressive and efficient reentry profiles for the RLV 10. The outer CMC panel 30 therefore represents a substantial improvement over conventional approaches.

The standoff attachment system 70 will now be described in greater detail. It can be seen that the standoff attachment system 70 preferably includes a plurality of attachment devices 71, 72, 73, 74, 75, 76 fixed to the primary structure of the RLV 10 at predetermined wall locations. A plurality of standoffs 81, 82, 83, 84, 85, 86 are coupled to the outer CMC panel 30 at predetermined panel locations, where each standoff extends between a panel location and a corresponding wall location. Standoffs 84 and 83 are also shown in detail in FIGS. 3 and 4. The standoff attachment system 70 further includes a plurality of attachment fittings 91, 92, 93, 94, 95, 96 fixed to the standoffs 81, 82, 83, 84, 85, 86 for coupling the standoffs to the attachment devices 71, 72, 73, 74, 75, 76. Turning now to FIG. 5, it can be seen that the standoffs 81, 82, 83, 84, 85, 86 are arranged in a predetermined configuration such that thermal expansion stresses in the outer CMC panel 30 are reduced. Thus, due to the large temperature differences throughout the panel 20 during reentry, the present invention accounts for the differences and the expansion and contraction of each component. Specifically, standoffs 81, 82, 83, 84, 85, 86 are positioned to relieve stress. Standoff 82 is fixed and provides a thermal attachment point. The other five standoffs 81, 83, 84, 85, 86 are aligned relative to the fixed standoff 82, and move as indicated by the dotted lines in order to minimize the stresses that are created due to the restrained thermal expansion of the panel 20.

With continuing reference to FIGS. 1 and 2, a method for fabricating the protective panel 20 will now be described in greater detail. The method includes the step of heating the foil bag 52 and the outer CMC panel 30 to a predetermined stretching temperature. The stretching temperature defines a temperature threshold at which the foil bag 52 expands to a circumference that is greater than the circumference of the attachment surface of the outer CMC panel 30. As already discussed, the attachment surface is preferably defined by curved perimeter stiffeners 32. The first opening 54 of the foil bag 52 is then positioned around the perimeter stiffeners 32 of the outer CMC panel 30. The method further provides for cooling the foil bag 52 and the outer CMC panel 30 to a predetermined shrinking temperature, where the shrinking temperature defines a temperature threshold at which the foil bag 52 attempts to retract to a circumference that is less than the circumference of the perimeter stiffeners 32. Fibrous insulation can then be disposed within the foil bag 52, and the back panel 56 is coupled to the second opening 58 of the foil bag 52. This allows the fibrous insulation to be encapsulated by the back panel 56, the foil bag, and the outer CMC panel 30. The method further includes the step of attaching the outer CMC panel 30, the foil bag 52, and the back panel 56 to the primary structure of the RLV 10 with the standoff attachment system 70. It is important to note that the thermal expansion mismatch between the foil bag 52 and the outer CMC panel 30 allows for a shrink fit attachment between the two components at a temperature of approximately 800° F. (426° C.). The shrink fit attachment provides a low cost manufacturing method. While shrink fitting is the preferred method of attachment, the foil bag 52 can also be attached using a brazed joint that results in slightly higher manufacturing costs. The foil bag 52 is sized relative to the actual fabricated circumference of the perimeter stiffeners 32, and is spliced together using a welded but joint.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A protective panel for a reusable launch vehicle, the protective panel comprising:
   an outer ceramic matrix composite (CMC) panel for isolating the launch vehicle from elevated temperatures;
   an insulative bag assembly coupled to the outer CMC panel for isolating the launch vehicle from elevated temperatures and moisture; and
   a standoff attachment system for attaching the outer CMC panel and the bag assembly to a tank wall of the launch vehicle.

2. The protective panel of claim 1 wherein the insulative bag assembly includes:
   a foil bag having a first opening shrink fitted to the outer CMC panel such that the first opening and the outer CMC panel form a water tight seal at temperatures below a desired temperature threshold;
   fibrous insulation contained within the foil bag for further protecting the launch vehicle from elevated temperatures; and
   a back panel coupled to a second opening of the foil bag such that the fibrous insulation is encapsulated by the back panel, the foil bag, and the outer CMC panel.

3. The protective panel of claim 2 wherein the desired temperature threshold is approximately 400° F.

4. The protective panel of claim 2 wherein the back panel is corrugated such that stiffness is increased along a predetermined axis of the back panel.

5. The protective panel of claim 2 wherein the back panel includes titanium.

6. The protective panel of claim 1 wherein the outer CMC panel includes a plurality of stiffening ridges for providing stability to the outer CMC panel, one or more of the stiffening ridges defining an attachment surface for coupling the insulative bag assembly to the outer CMC panel.

7. The protective panel of claim 6 wherein the stiffening ridges include perimeter stiffeners disposed adjacent to a perimeter of the outer CMC panel.

8. The protective panel of claim 7 wherein the perimeter stiffeners are curved to improve coupling between the insulative bag assembly and the outer CMC panel.

9. The protective panel of claim 6 wherein the stiffening ridges include internal stiffeners disposed adjacent to a non-perimeter region of the outer CMC panel.

10. The protective panel of claim 1 wherein the outer CMC panel includes C/SiC.

11. The protective panel of claim 1 wherein the standoff attachment system includes:
   a plurality of attachment devices fixed to the tank wall of the launch vehicle at predetermined wall locations;
   a plurality of standoffs coupled to the outer CMC panel at predetermined panel locations, each standoff extending between a panel location and a corresponding wall location;
   a plurality of attachment fittings fixed to the standoffs for coupling the standoffs to the attachment devices.

12. The protective panel of claim 11 wherein the standoffs are arranged in a predetermined configuration such that thermal expansion stresses in the outer CMC panel are reduced.

13. An insulative bag assembly for a reusable launch vehicle protective panel, the bag assembly comprising:
   a foil bag having a first opening shrink fitted to an outer panel such that the first opening and the outer panel form a water tight seal at temperatures below a desired temperature threshold;
   fibrous insulation contained within the foil bag for protecting the launch vehicle from elevated temperatures; and
   a back panel coupled to a second opening of the foil bag such that the fibrous insulation is encapsulated by the back panel, the foil bag, and the outer panel.

14. The bag assembly of claim 13 wherein the desired temperature threshold is approximately 400° F.

15. The bag assembly of claim 13 wherein the back panel is corrugated such that stiffness is increased along a predetermined axis of the back panel.

16. The bag assembly of claim 13 wherein the back panel has a curved perimeter.

17. A method for fabricating a reusable launch vehicle protective panel, the method comprising the steps of:
   heating a foil bag and an outer ceramic matrix composite (CMC) panel to a predetermined stretching temperature, the stretching temperature defining a temperature threshold at which the foil bag expands to a circumference that is greater than a circumference of an attachment surface of the outer CMC panel;
   positioning a first opening of the foil bag around the attachment surface of the outer CMC panel; and
   cooling the foil bag and the outer CMC panel to a predetermined shrinking temperature, the shrinking temperature defining a temperature threshold at which the foil bag attempts to retract to a circumference that is less than the circumference of the attachment surface.

18. The method of claim 17 further including the step of heating the foil bag and the outer CMC panel to approximately 800° F.

19. The method of claim 17 further including the steps of:
   disposing fibrous insulation within the foil bag; and
   coupling a back panel to a second opening of the foil bag such that the fibrous insulation is encapsulated by the back panel, the foil bag, and the outer CMC panel.

20. The method of claim 19 further including the step of attaching the outer CMC panel, the foil bag, and the back panel to a tank wall of the reusable launch vehicle with a standoff attachment system.

* * * * *